R. W. BUNTING.
Land-Roller.

No. 199,508. Patented Jan. 22, 1878.

Witnesses:
G. B. Towle
H. C. Thompson

Inventor:
Roger W. Bunting
by Myers & Co
Attorneys.

UNITED STATES PATENT OFFICE.

ROGER W. BUNTING, OF MADISON, MICHIGAN.

IMPROVEMENT IN LAND-ROLLERS.

Specification forming part of Letters Patent No. 199,508, dated January 22, 1878; application filed October 20, 1877.

*To all whom it may concern:*

Be it known that I, ROGER W. BUNTING, a resident of Madison, in the county of Livingston and State of Michigan, have invented certain new and useful Improvements in Land-Rollers; and I do hereby declare that the following is a full, clear, and exact description of my invention, which will enable others skilled in the art to which it appertains to make and use the same, reference being had to the accompanying drawings, and to the letters of reference marked thereon, which form a part of this specification.

My invention relates to that class of agricultural implements commonly known as "land-rollers;" and consists in certain modifications and improvements in the construction of the same, as hereinafter shown and described.

Figure 1:
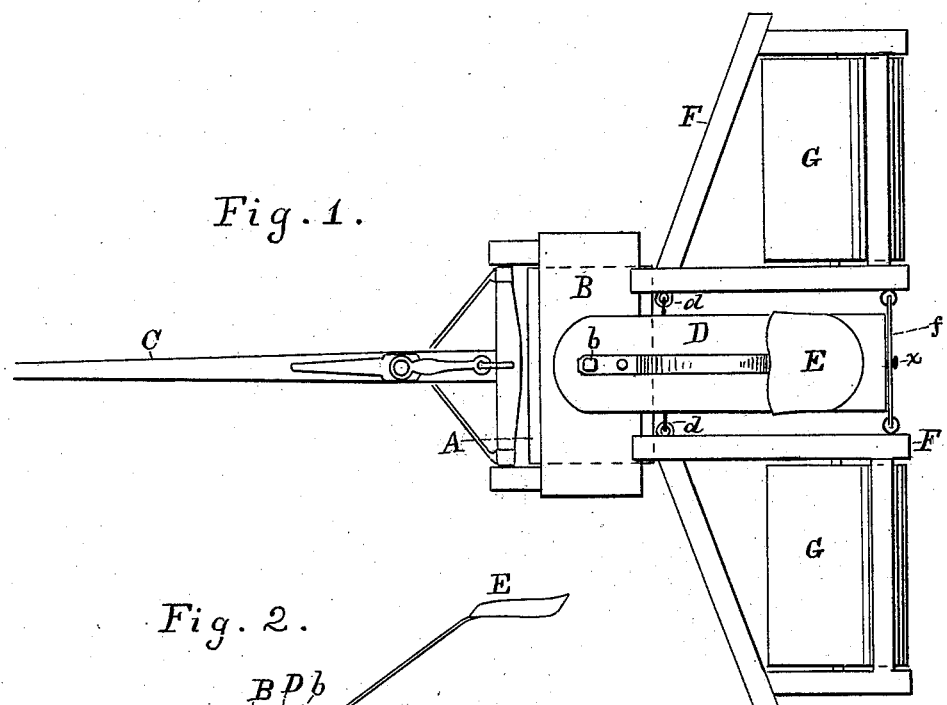
Figure 2:
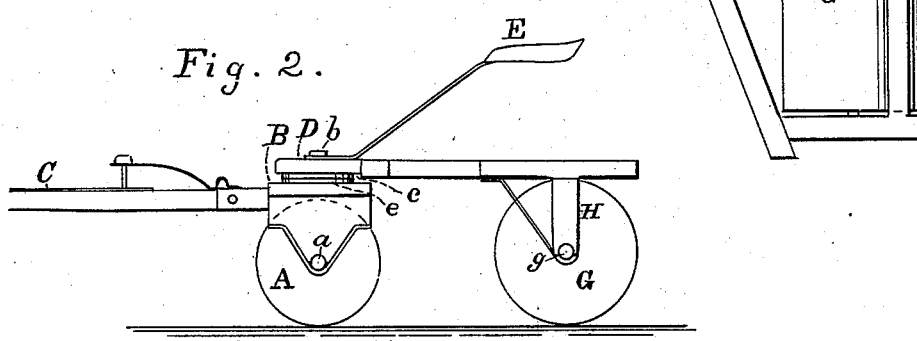
Figure 3:
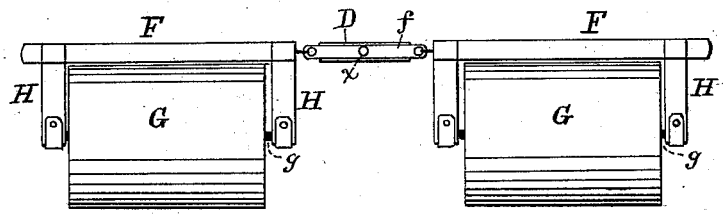

In the accompanying drawings, forming a part of this specification, Figure 1 represents a plan of my improved land-roller. Fig. 2 is a side view of the same. Fig. 3 is a rear view.

In my construction three rollers are used, one being a short distance forward of the other two, as shown in Fig. 1.

A designates the forward roller, over which is placed a platform or frame, B, provided with hangers at its extremities to receive the arms $a$ of the roller. To this frame B is properly connected the tongue or draft-pole C, as shown.

D is a platform, which is placed at right angles with B, the forward end resting thereon across the center, and being pivoted thereto by the bolt $b$. The bearing-points of the parts B and D are provided with the plates $c$ and $e$, through which the bolt $b$ passes, thus forming a pivotal connection of said parts. The driver's seat E is secured to the platform D, as shown in the drawing.

Two frames (indicated by F) are placed, one on each side of the platform D, to which each frame is coupled or linked at $d$. A short bar, $f$, is pivoted at $x$ to the rear end of the platform D, each end of said bar connecting loosely with one of the frames F, so as to allow each of these frames a movement which is somewhat independent, while the platform D is allowed to keep its level position.

Below each of the frames F is placed one of the rear rollers G, the arms $g$ of said rollers being received by the hangers H, projecting downward from the frames F. The rollers G are arranged to move forward together, their axes being on the same right line, and the forward roller A, by means of the pivotal connection at $b$, has an independent turning movement.

Having described my invention, I claim—

The frame D, pivotal bar $f$, links $d$, and frames F, substantially as shown, and for the purpose specified.

In testimony that I claim the foregoing as my own invention I affix my signature in presence of two witnesses.

ROGER W. BUNTING.

Witnesses:
GUY A. COLE,
JAMES BENNETT.